United States Patent
Kolasinski et al.

(10) Patent No.: US 12,405,364 B2
(45) Date of Patent: Sep. 2, 2025

(54) FUSION OF SHORT RANGE RADARS AND TAILGATE CAMERAS FOR TRAILER ANGLE ESTIMATION

(71) Applicant: Continental Autonomous Mobility US, LLC, Auburn Hills, MI (US)

(72) Inventors: Kyle Kolasinski, Howell, MI (US); Ryan Jones, Ann Arbor, MI (US); Eric Kratz, Auburn Hills, MI (US); Carlos Armando Ortiz Lopes, Auburn Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 0 days.

(21) Appl. No.: 18/007,398

(22) PCT Filed: Jul. 29, 2021

(86) PCT No.: PCT/US2021/071055
§ 371 (c)(1),
(2) Date: Jan. 30, 2023

(87) PCT Pub. No.: WO2022/027063
PCT Pub. Date: Feb. 3, 2022

(65) Prior Publication Data
US 2024/0255636 A1 Aug. 1, 2024

Related U.S. Application Data

(60) Provisional application No. 63/058,199, filed on Jul. 29, 2020.

(51) Int. Cl.
G01S 13/86 (2006.01)
G01S 13/87 (2006.01)
G01S 13/931 (2020.01)

(52) U.S. Cl.
CPC ............ *G01S 13/867* (2013.01); *G01S 13/87* (2013.01); *G01S 2013/93272* (2020.01)

(58) Field of Classification Search
CPC ...................................................... G01S 17/00
See application file for complete search history.

(56) References Cited

U.S. PATENT DOCUMENTS

2004/0051659 A1* 3/2004 Garrison ............... G01S 13/867
342/72
2009/0005932 A1 1/2009 Lee
(Continued)

FOREIGN PATENT DOCUMENTS

CN 111344214 A 6/2020
JP 2014002056 A 1/2014

OTHER PUBLICATIONS

The International Search Report and the Written Opinion of the International Searching Authority mailed on Nov. 8, 2021 for the counterpart PCT Application No. PCT/US2021/071055.
(Continued)

*Primary Examiner* — Bernarr E Gregory

(57) ABSTRACT

A method and system are disclosed for determining a trailer angle between a vehicle and a trailer attached to a the vehicle. The method includes receiving camera data from a camera supported by a rear portion of the vehicle, left radar data from a left short-range radar supported by a left rear portion of the vehicle, and right radar data from a right short-range radar supported by a right rear portion of the vehicle. A trailer angle is estimated based on the camera data, the left radar data, and the right radar data. The estimated trailer angle is sent to one or more vehicle systems associated with the vehicle.

16 Claims, 6 Drawing Sheets

(56) References Cited

U.S. PATENT DOCUMENTS

| | | | |
|---|---|---|---|
| 2014/0160276 A1 | 6/2014 | Pliefke | |
| 2017/0334484 A1 | 11/2017 | Koravadi | |
| 2017/0363727 A1* | 12/2017 | Prasad | G01S 13/878 |
| 2017/0363728 A1* | 12/2017 | Prasad | G01S 13/878 |
| 2018/0068566 A1* | 3/2018 | Prasad | G01S 13/867 |
| 2018/0127024 A1 | 5/2018 | Pourrezaei Khaligh | |
| 2018/0356214 A1 | 12/2018 | Kozak | |
| 2019/0129429 A1* | 5/2019 | Juelsgaard | G01S 17/00 |
| 2019/0235519 A1 | 8/2019 | Carter | |
| 2020/0110163 A1* | 4/2020 | Wang | G01S 13/872 |
| 2020/0148018 A1 | 5/2020 | Lavoie | |

OTHER PUBLICATIONS

European Examination Report dated Jan. 23, 2025 corresponding with European Application No. 21758997.7.
Chinese First Office Action dated May 30, 2025 for the Counterpart Chinese Patent Application No. 202180066429.9 and machine translation of same.

* cited by examiner

FUSION OF SHORT RANGE RADARS AND TAILGATE CAMERAS FOR TRAILER ANGLE ESTIMATION

The present application is a National Stage Application under 35 U.S.C. § 371 of International Patent Application PCT/US2021/071055 filed on Jul. 29, 2021, and claims the benefit of U.S. provisional patent application No. 63/058,199, filed Jul. 29, 2020, in the U.S. Patent and Trademark Office which is incorporated by reference herein.

TECHNICAL FIELD

This disclosure relates to a method and system for fusion short-range radar data and tailgate camera data for trailer angle estimation.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used.

Some of the challenges that face tow vehicle drivers is driving in the rearward direction while being attached to the trailer because more than one person may be needed to maneuver the vehicle-trailer unit towards the specific location. Since the vehicle-trailer unit swivels around the hitch horizontally allowing the vehicle-trailer unit to move around corners, when the vehicle backs up, it pushes the trailer. Drivers are often confused as to which way to turn the vehicle steering wheel to get the desired change of direction of the trailer especially when backing into a parking spot. Applying an incorrect steering angle in the vehicle may also cause the trailer to jack-knife and lose its course. Therefore, oftentimes, one person drives the vehicle, e.g., the driver, and another one or more people are needed to view the tow vehicle and the trailer and provide the driver with directions regarding the path that the tow vehicle has to take. In some instances, the people providing directions to the driver may have difficulty providing efficient instructions for directing the path of the tow vehicle. Moreover, the driver may not be properly trained and/or may not have enough experience to back-up the tow vehicle and the trailer. In some examples, even trained drivers may struggle with backing up the tow vehicle while attached to the trailer because the trailer may have unfamiliar dimensions or is not easily maneuvered. Other difficulties may arise while parking the tow vehicle and the trailer, because the driver may have blind zones that do not allow adequate sight angles to properly park the tow vehicle and the trailer or the parking lot may be too tight to be able to maneuver the vehicle and the trailer.

Some vehicles are equipped with a trailer reverse assist system that guides a trailer while backing up using a knob located inside of the vehicle. This is in lieu of the traditional way to back a trailer up, which is based on steering wheel input only. The trailer reverse assist function is meant as a comfort feature to those inexperienced at backing a trailer. The trailer reverse assist system functions using a camera located in the tailgate of the vehicle which senses the trailer angle and wheelbase. In another implementation of the trailer reverse assist system, the estimated angle and wheelbase are provided to a driving function that controls the steering wheel angle and acceleration and braking are controlled by the tow vehicle driver.

Some current systems only support traditional bumper mounted trailers and lack the ability to support fifth wheel and gooseneck trailers. In addition, there are limitations with current systems. Namely, the higher the angle made between the trailer and the vehicle, the more inaccurate the angle becomes through the tailgate camera. Some current implementations of trailer reverse assist systems may have trailer angle limits of 45 degrees. Additionally, the tailgate camera may not be able to support several classes of trailers, including fifth wheel and gooseneck trailers. Therefore, it is desirable to provide a system that overcomes the challenges faced by drivers of tow vehicles attached to a trailer.

SUMMARY

Example embodiments of the present disclosure overcome shortcomings of current trailer related assist systems and thereby satisfy a need for a more robust estimation of the trailer angle formed between the tow vehicle and the trailer, for use by a trailer reverse assist system, for example. One example embodiment is directed to a method for determining at least one parameter associated with a trailer, such as a trailer angle between a trailer and an attached vehicle. The method includes receiving camera data from a camera supported by a rear portion of the vehicle, and receiving radar data from at least one short range radar supported by the vehicle. A trailer angle is estimated based on the camera data and the radar data. The estimated trailer angle is sent to one or more vehicle systems associated with the vehicle.

Receiving the radar data may include receiving right radar data from a right short-range radar supported by a right rear portion of the vehicle, and receiving left radar data from a left short range radar supported by a left rear portion of the vehicle. In this instance, estimating the trailer angle is based upon the right radar data and the left radar data.

The radar data may include an estimate of the trailer angle generated by the at least one short range radar, and the camera data may include an estimate of the trailer angle generated by the camera.

Estimating the trailer angle may be performed by data processing hardware in the camera, in the at least one short range radar, or in the vehicle that is separate from the camera and the at least one short range radar.

Estimating the trailer angle may use statistically weighted averaging of the radar data and the camera data. In this case, weights for the statistically weighted averaging are based upon one or more of a light condition of the environment of the vehicle and trailer, a most recently estimated trailer angle, or a number of reflections associated with the radar data. Estimating the trailer angle may use a Kalman filter. Estimating the trailer angle may include fusing the camera data and the radar data. In addition, the method may include estimating a wheelbase of the trailer based upon the camera data and the radar data, wherein the radar data includes an estimate of the wheelbase generated by the at least one short range radar, and the camera data includes an estimate of the wheelbase generated by the camera.

An example embodiment is directed to a system for determining a trailer angle between a vehicle and a trailer attached thereto. The system includes data processing hardware and memory hardware in communication with the data processing hardware. The memory hardware stores instructions that when executed on the data processing hardware cause the data processing hardware to perform operations forming a method as described herein. The data processing hardware may be in the camera, in the at least one short range radar or in the vehicle that is separate from the camera and the at least one short range radar.

DESCRIPTION OF DRAWINGS

Like reference symbols in the various drawings indicate like elements.

DETAILED DESCRIPTION

A tow vehicle, such as, but not limited to a car, a crossover, a truck, a semi-truck, a van, a sports-utility-vehicle (SUV), and a recreational vehicle (RV) may be configured to tow a trailer. The tow vehicle connects to the trailer by way of a trailer hitch. In general terms, example embodiments of the present disclosure are directed to a tow vehicle-trailer system which estimates the trailer angle between the tow vehicle and the connected trailer in part by fusing data from a rear-mounted camera and rear-mounted short range radars. The resulting trailer angle estimate, according to the example embodiments, allows for use with trailers including fifth wheel and gooseneck trailers. The trailer angle estimate may be used, for example, by a trailer reverse assist system for preventing a jack-knife event from occurring while the tow vehicle is operated in reverse.

Figure 1:
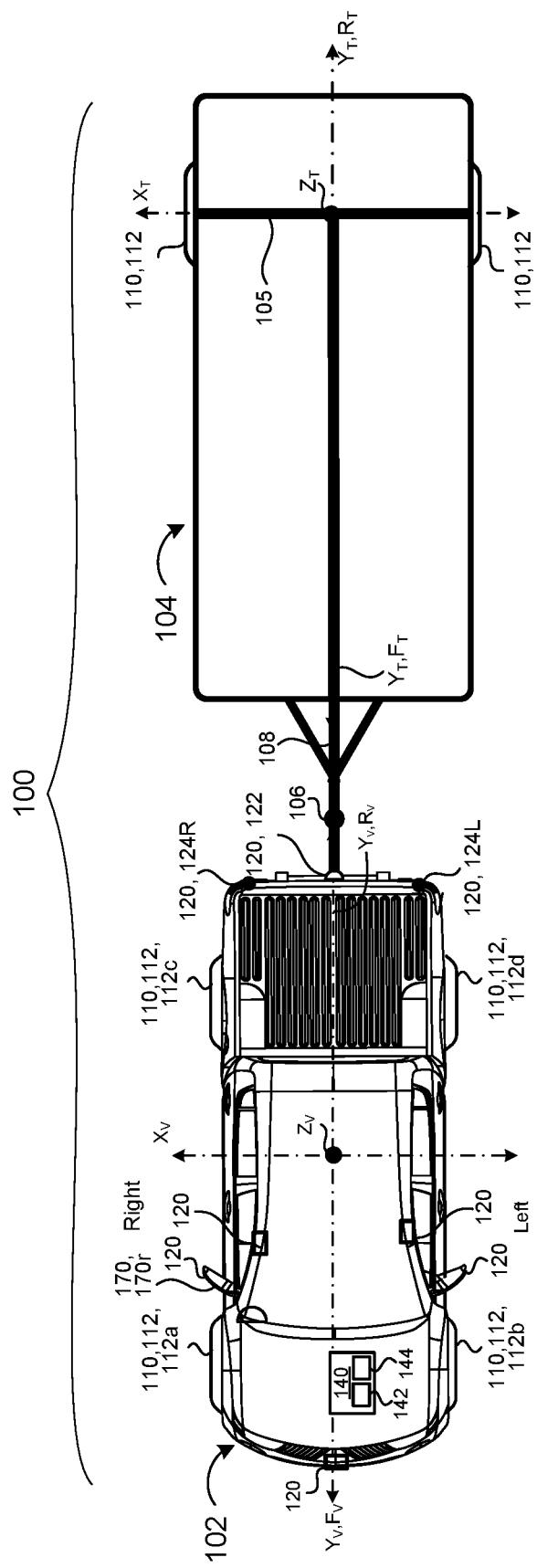
FIG. 1 is a schematic view of an example vehicle-trailer system according to an example embodiment.
Figure 2:
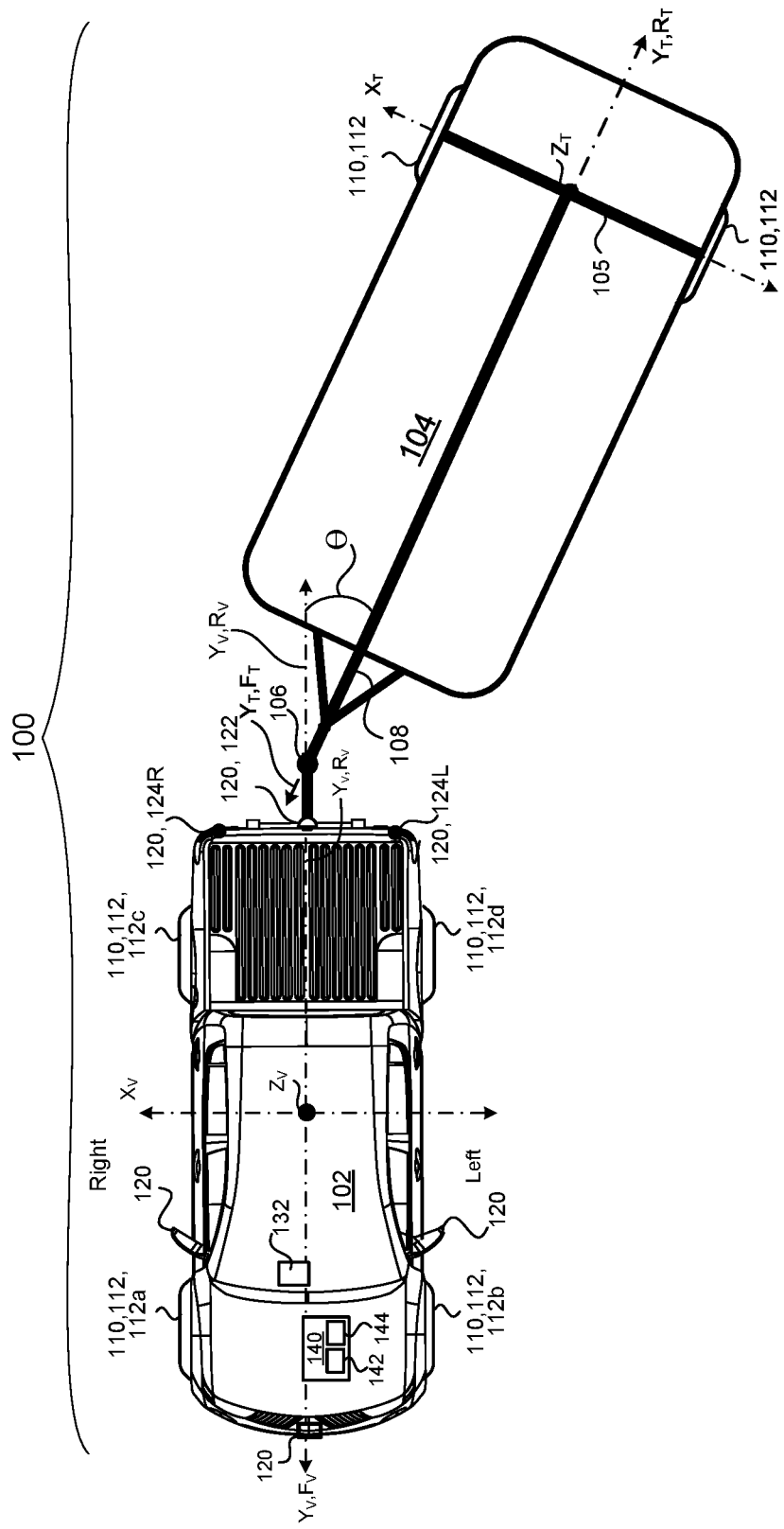
FIG. 2 is a schematic view of the exemplary vehicle-trailer system of FIG. 1 in which the trailer is at an oblique angle relative to the tow vehicle.
Figure 3:
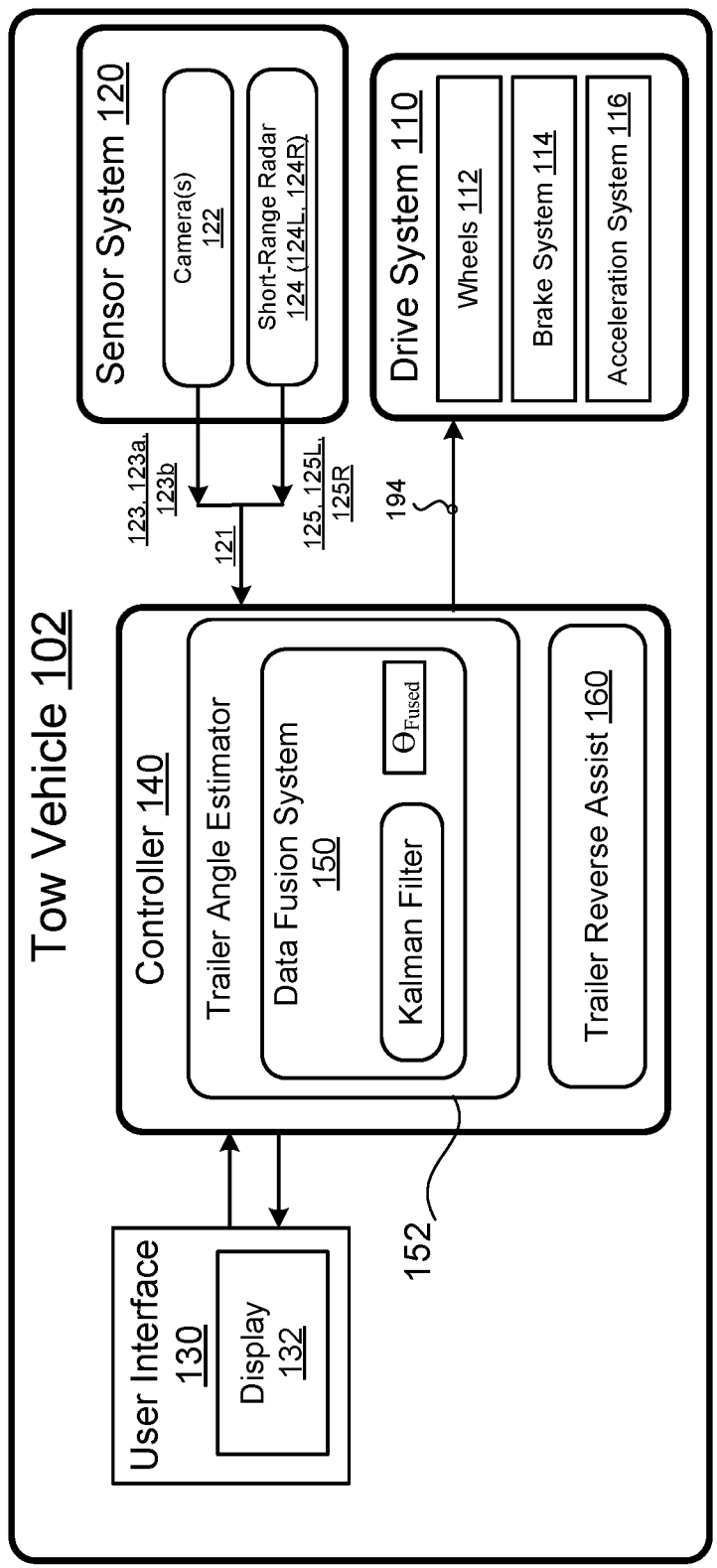
FIG. 3 is a schematic view of the tow vehicle of FIG. 1.
Figure 4:
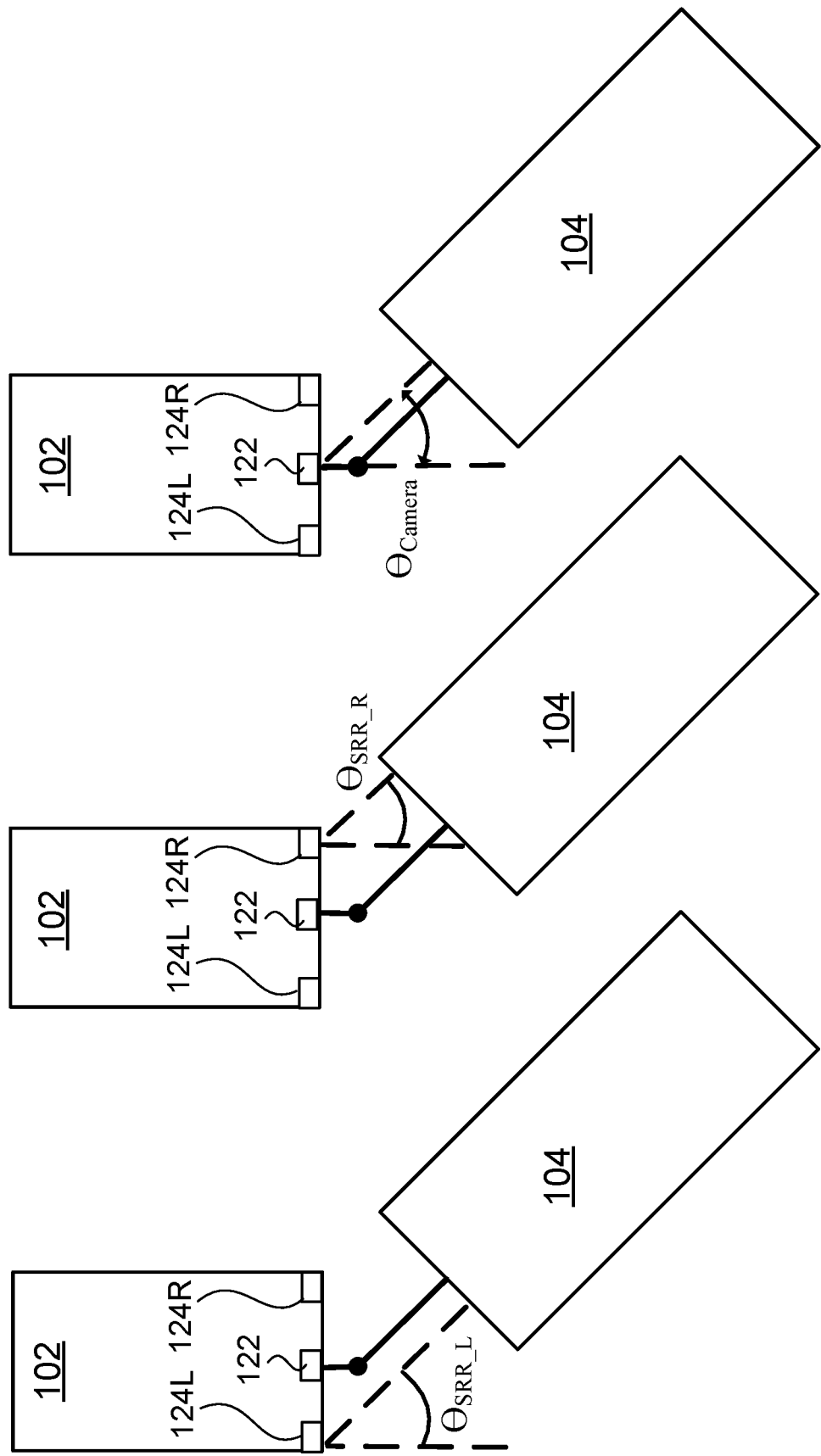
FIG. 4 is a schematic view of example vehicle-trailer system of FIG. 1 showing trailer angle estimations from different sensors.

Referring to FIGS. 1-3, in some implementations a vehicle-trailer system 100 includes a tow vehicle 102 attached to a trailer 104 by way of a hitch 106. The tow vehicle 102 includes a drive system 110 associated with the tow vehicle 102 that maneuvers the tow vehicle 102 and thus the vehicle-trailer system 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 includes other components (not shown) that are in communication with and connected to the wheels 112 and that allow the tow vehicle 102 to move, thus moving the trailer 104 as well. The drive system 110 may also include a brake system 114 that includes brakes (not shown) associated with each wheel 112, 112a-d, where each brake is associated with a wheel 112a-n and is configured to slow down or stop the wheels 112a-n from rotating. The tow vehicle 102 may also include an acceleration system 116 that is configured to adjust a speed and direction of the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and/or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$ extends between a right side R and a left side of the trailer 104. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$.

The tow vehicle 102 may include a sensor system 120 to provide reliable and robust driving in a fully or partially autonomous manner. The sensor system 120 may include different types of sensors 122, 124 that may be used separately or with one another to create a perception of the environment of the tow vehicle 102 that is used for the vehicle 102 to drive and aid the driver in make intelligent decisions based on objects and obstacles detected by the sensor system 120. In some examples, the sensors 122, 124 are supported by the tow vehicle 102 only, while in other examples, the trailer 104 may support one or more sensors 122, 124. The sensors 122, 124 may be positioned on a rear section of the tow vehicle 102 for capturing a rearward environment of the tow vehicle 102, a side section of the tow vehicle 102 for capturing a left/right environment of the tow vehicle 102, and/or a front section of the tow vehicle 102 for capturing a front environment of the tow vehicle 102. The combination of sensors 122, 124 positioned around the tow vehicle 102 or the vehicle-trailer system 100 provides a surround view of the environment of the tow vehicle 102 and/or the trailer 104.

The sensor system 120 includes one or more cameras 122 that provide camera data 123, 123a. The one or more cameras 122 may include one or more monochrome and/or monocular cameras. As shown in FIGS. 1 and 2, the camera 122 is disposed along the rear of the tow vehicle 102, such as along the rear bumper or the tailgate. It is understood that more than a single camera 122 may be used along the rear portion of the tow vehicle 102. In some examples, the camera(s) 122 may include a fisheye lens that includes an ultra wide-angle lens that produces strong visual distortion intended to create a wide panoramic or hemispherical image 123a. Fisheye cameras capture images 123a having an extremely wide angle of view. Other types of cameras may also be used to capture images 123a of the vehicle and trailer environment. The camera data 123 may include additional data 123b such as intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in world coordinates). In addition, the camera data 123 may include minimum/maximum/average height of each camera 122 with respect to ground (e.g., when the vehicle is loaded and unloaded), and a longitudinal distance between the camera 122 and the tow vehicle hitch ball.

The sensor system 120 includes short-range radar (SRR) 124 that provide radar data 125. SRRs 124 operate around the vehicle 102 when in motion and detect potential impacts with objects and obstacles such as, but not limited to, cars, pedestrians, etc. In one embodiment, FIGS. 1 and 2 show a short range radar 124L disposed along a left, rear portion of the tow vehicle 102 and a short range radar 124R disposed along a right, rear portion of the tow vehicle 102. It is understood that more or less than two short range radars may be disposed along the rear portion of the tow vehicle 102.

In some examples, the sensor system 120 also includes one or more wheel encoders (not shown) associated with one or more wheels 112, 112a-d of the tow vehicle 102. The sensor system 120 may also include one or more acceleration and wheel angle sensors (not shown) associated with the tow vehicle 102. The acceleration and wheel angle sensors determine data that includes the acceleration of the tow vehicle 102 in the directions of the transverse axis $X_V$ and fore-aft axis $Y_V$. The sensor system 120 may also include an IMU (inertial measurement unit) (not shown) configured to measure IMU data that includes the vehicle's linear acceleration (using one or more accelerometers) and rotational rate (using one or more gyroscopes). In some examples, the IMU data also includes a heading reference of the tow vehicle 102. Therefore, the IMU data includes a pitch, roll, and yaw of the tow vehicle 102.

The sensor system 120 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, stereo cameras, infrared sensor. etc. In some examples, the tow vehicle 102 includes a Global Positioning System (GPS) receiver (not shown) that determines a latitude and longitude position of the tow vehicle 102. FIGS. 1 and 2 illustrate sensors 120 appearing along the front and side portions of the tow vehicle 102, and such sensors may be cameras 122, short range radars 124 and/or other sensors described above.

The sensor data 121 may be used to alert the driver of possible obstacles when the vehicle-trailer system 100 is traveling in the forward direction $F_V$ or in the rearward direction $R_V$, by way of audible alerts and/or visual alerts via the user interface 130. Therefore, the sensor system 120 is especially useful for increasing safety in the vehicle-trailer system 100 which operates by the driver or under semi-autonomous or autonomous conditions.

The tow vehicle 102 may include a user interface 130 that provides information to the driver and allows the driver to input commands. The user interface 130 receives one or more user commands from the driver via one or more input mechanisms, a touch screen display 132, a microphone, and/or displays or outputs one or more notifications to the driver. In some examples, the user interface 130 includes a touch screen display 132. In other examples, the user interface 130 is not a touchscreen and the driver may use an input device, such as, but not limited to, a rotary knob or a mouse for providing data from the driver or other user of the tow vehicle 102.

The drive system 110, the sensor system 120, and the user interface 130 are in communication with a vehicle controller 140. The vehicle controller 140 includes a computing device (or data processing hardware) 142 (e.g., central processing unit having one or more computing processors) in communication with non-transitory memory or hardware memory 144 (e.g., a hard disk, flash memory, random-access memory) capable of storing instructions executable on the computing processor(s)). As shown, the vehicle controller 140 is supported by the tow vehicle 102; however, the vehicle controller 140 may be separate from the tow vehicle 102 and in communication with the tow vehicle 102 via a network (not shown).

In the example embodiments, the controller 140 includes a data fusion system or module 150 that analyses sensor system data 121 which includes camera data 123 and short-range radar data 125. The data fusing system 150 fuses camera (image) data 123 from camera 122 with short range radar data 125 and estimates a trailer angle θ from the fused data, with the trailer angle being an angle formed between the fore-aft axis $Y_V$ of the tow vehicle 102 and the fore-aft axis $Y_T$ of the trailer 104. The data fusion system 150 may form part of a trailer angle estimator system or module 152. In one implementation, the trailer angle estimator system 152 forms part of a trailer reverse assist system or module 160 of the tow vehicle 102 for providing the estimated trailer angle θ; and in another implementation illustrated in FIG. 3, the trailer angle estimator system 152 is separate from and provides the estimated trailer angle to the trailer reverse assist system 160 and other vehicle systems which utilize trailer angle estimations. The inclusion of the short-range radar data 125 in the data fusion system 150 enables use of additional classes of trailers 104 in the execution of a trailer reverse assist functions of the trailer reverse assist system 160 as well as other trailering functions performed by the tow vehicle 102, for example. The trailer types that are enabled by the use of the data fusion system 150 include gooseneck trailers and fifth wheel trailers. A tow vehicle 102 having the data fusion system 150 adds robustness to the traditional sensor system 120 that is used by the trailer reverse assist system 160, especially at higher trailer angles θ.

Because of the pivot point of fifth wheel trailers or gooseneck trailers, the towing vehicle 102 has the unique ability to have relatively higher trailer angles θ without causing a jack-knife event. Unfortunately, this means that the trailer 104 would be completely outside the field of view of the tailgate camera 122. By adding short range radars 124 (124L and 124R) to the rear corners of the vehicle 102 and using the short range radars to detect higher trailer angles θ between the trailer 104 and vehicle 102, the data fusion system 150 enables gooseneck and fifth wheel trailers for use with the trailer reverse assist system 160.

Figure 5:
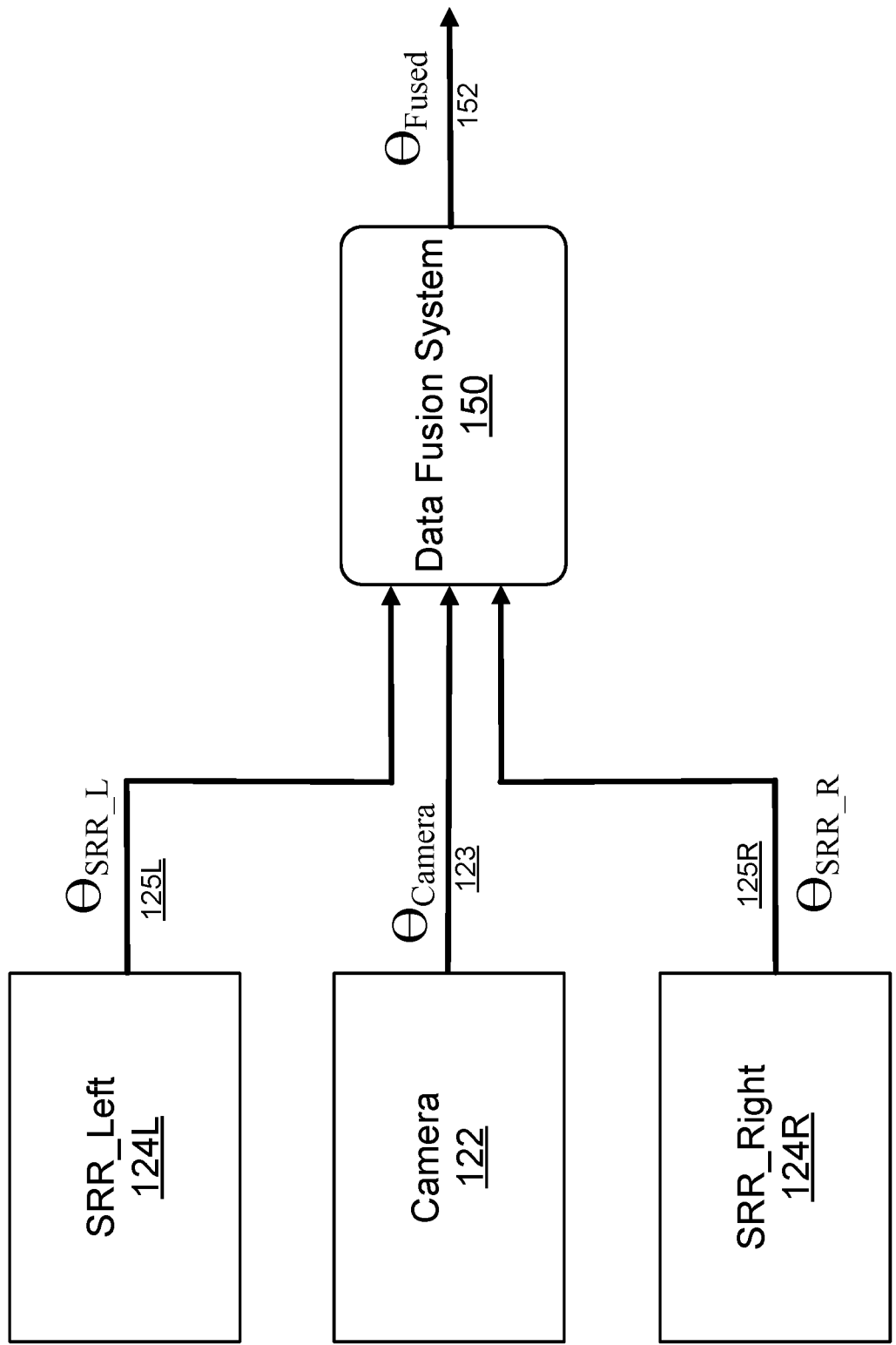
FIG. 5 is a schematic view of an aspect of the vehicle-trailer system of FIG. 1 according to an example embodiment.
Figure 6:
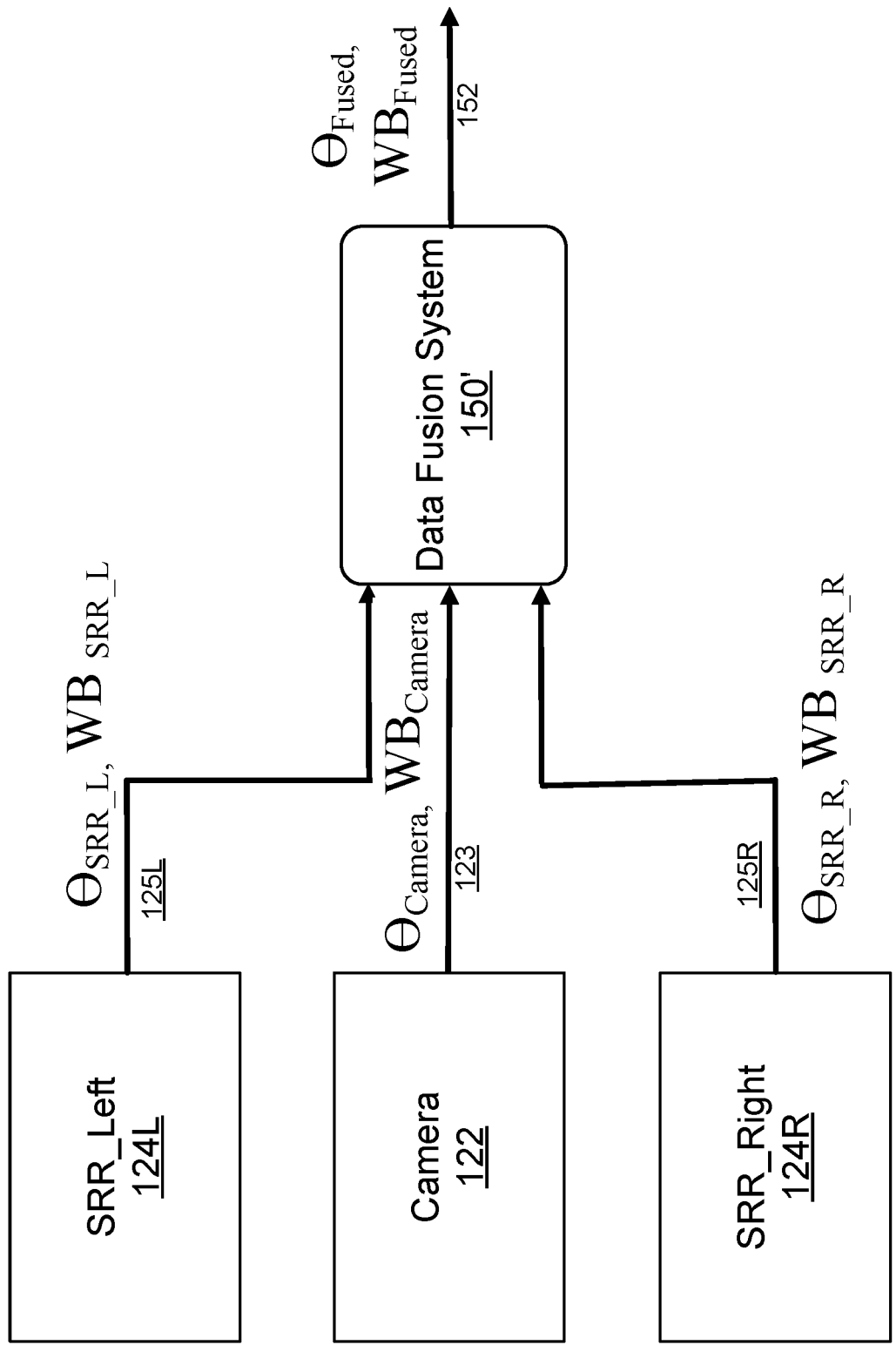
FIG. 6 is a schematic view of an aspect of the vehicle-trailer system of FIG. 1 according to another example embodiment.

In one example embodiment, each of the camera 122 and short range radars 124L, 124R independently estimates the trailer angle θ using the available raw data collected by the corresponding sensor. The short-range radars 124 estimate the trailer angle θ based upon the radar reflections from the trailer 104. The calculated trailer angles θ from short range radars 124L (i.e., the left short range radar) and 124R (the right short range radar) are referred to as $\theta_{SRR\_L}$ and $\theta_{SRR\_R}$, respectively. The rear-mounted camera 122 estimates the trailer angle θ using the captured images 123 which is referred to as $\theta_{Camera}$ as shown in FIGS. 5 and 6. Each individual estimate ($\theta_{SRR\_L}$, $O_{SRR\_R}$ and $\theta_{Camera}$) is sent to a common processing block, in this case the data fusion system 150, to perform data fusion and in particular to estimate the trailer angle $\theta_{Fused}$ that is derived from the fused data. The estimated trailer angle $\theta_{Fused}$ may be provided to and used by the trailer reverse assist system 160, for example, for use in preventing a jack-knife event.

The data fusion system 150 fuses the sensor data provided by camera 122 and short range radars 124L, 124R and generates a trailer angle estimate $\theta_{Fused}$ based upon the sensor data received. In the illustrated example embodiment, the data fusing system 150 receives the trailer angle estimates from each of the camera 122 and the short range radars 124L and 124R, and performs statistically weighted averaging of the trailer angle estimates. The statistical weighed averaging assigns weights to each received trailer angle estimate θ based upon a level of trust in the received estimate. A number of factors are considered in setting the trust level and/or weight to each received sensor data (trailer angle estimate). Such factors may include the amount of light and/or the light conditions of the environment of the tow vehicle 102 and the trailer 104, which affects the sensor data provided by the camera 122; weather conditions in the environment of the tow vehicle 102 and the trailer 104, including fog, which affects the sensor data provided by the camera 122; the number of radar reflections which affects the sensor data provided by the short range radars 124L and 124R; and the last determined location of the trailer 104 relative to the tow vehicle 102, which affects both the camera 122 and the short range radars 124L and 124R. The factors may be provided to the data fusion system 150 via sensors or other devices. It is understood that a number of other factors may be used in determining the weighting to apply to the sensor data provided by the camera 122 and the short range radars 124L and 124R. Based upon the provided factors, the data fusion system 150 determines weights to apply to the sensor data from each camera and short range radar, and estimates a trailer angle $\theta_{Fused}$ that is based upon the received sensor data and the factors. The trailer angle estimate is then sent to, for example, the trailer reverse assist system 160 for use in preventing a jack-knife event from occurring.

Information such as the wheelbase estimates and quality information may also be sent to improve the accuracy of the fused estimate of the trailer angle $\theta_{Fused}$. The data fusion system includes a model which understands the benefits of using each sensor 122, 124L and 124R at the various trailer angles θ in order to optimize the trailer angle estimate. For example, it is advantageous to use the trailer angle estimates from the radars at higher angles as there is more trust in the short range radars 124 in high angle situations, so the data fusion system 150 gives greater weight to the trailer angle estimates $\theta_{SRR}$ at higher trailer angles. Alternatively, the trailer angle estimates $\theta_{Camera}$ from the camera 122 are more trustworthy at near zero angles and are given greater weights than trailer angle estimates from the short range radars 124L and 124R.

In one implementation, the data fusing system 150 uses a Kalman filter to perform the statistical weighted averaging for estimating the trailer angle $\theta_{Fused}$. It is understood that the statistical weighted averaging operation may have any of a number of different implementations.

In the example embodiment(s) described above with respect to FIG. 5, each of the short range radar 124L and 124R and the camera 122 estimates the trailer angle θ based upon its own sensed data; and the data fusion system 150, located in or executed by the controller 140 that is separate from the sensors 122, 124, receives the trailer angle estimates from each sensor 122, 124 and fuses the trailer angle information for use in estimating the trailer angle $\theta_{Fused}$. In another example embodiment, the camera 122 and the short range radars 124L and 124R do not estimate the trailer angle θ and instead provide raw sensor data to the data fusion system 150 of the controller 140. In this example embodiment, the data fusion system 150 estimates trailer angles $\theta_{SRR\_L}$, $\theta_{SRR\_R}$, and $\theta_{camera}$ in addition to estimating the trailer angle $\theta_{Fused}$ therefrom.

In yet another example embodiment, the data fusion system 150 forms part of the sensor system 120 and particularly one of the camera 122 or the short range radar 124L and 124R which has computational and/or processing capability for estimating trailer angle $\theta_{Fused}$. In this example embodiment, the camera 122 or short range radar 124L, 124R having the data processing hardware which performs the trailer angle estimation receives sensor data from the camera 122 and short range radar 122, 124 which does not estimate the trailer angle $\theta_{Fused}$ as well as sensor data from the sensor which performs the trailer angle estimation.

Fusing data between the short range radars 124L and 124R and the cameras 122 by the data fusion system 150 markedly improves the robustness of trailer assist systems of the two vehicle, especially in high angle situations and expands trailer assist functionality for use with gooseneck trailers and fifth wheels trailers. Further, the trailer angle estimator system 152, which includes the data fusion system 150, utilizes sensors commonly found on many vehicles for performing traditional radar functions such as blind spot detection, rear cross traffic alert, and trailer merge assist, so there is no additional hardware cost in including the trailer angle estimator system 152 in the tow vehicle 102.

In the example embodiment described above, the data fusion system 150 fuses trailer angle estimates from the rear facing camera 122 and the short range radars 124L and 124R to arrive at a fused trailer angle $\theta_{Fused}$ therefrom. In another example embodiment, the data fusion system 150' fuses the wheelbase WB of the trailer along with fusing the trailer angle θ. As shown in FIG. 6, each of the camera 122 and the short range radars 124L and 124R additionally estimates the wheelbase WB of the trailer 104, i.e., the distance between the trailer's axles. The data fusion system 150' receives the wheelbase estimate $WB_{Camera}$ from the camera 122, the wheelbase estimate $WB_{SRR\_L}$ from the short range radar 124L and the wheelbase estimate $WB_{SRR\_R}$ from the short range radar 124R, and fuses the wheelbase estimates to determine the (fused) wheelbase $WB_{Fused}$ of the trailer 104. According to this example embodiment, an implementation having a Kalman filter uses the same filtering algorithm for wheelbase and trailer angle determinations and outputs both the fused trailer angle $\theta_{Fused}$ and the fused wheelbase $WB_{Fused}$. The fused wheelbase $WB_{Fused}$ of the trailer 104 may be used in one or more trailer assist systems, such as the trailer reverse assist system 160.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for determining at least one parameter of a trailer coupled to a vehicle, the method comprising:
   receiving camera data from a camera supported by a rear portion of the vehicle;
   receiving radar data from at least one short range radar supported by the vehicle;
   estimating a trailer angle between a trailer and the vehicle coupled thereto based on the camera data and the radar data using statistically weighted averaging of the radar data and the camera data; and
   sending the estimated trailer angle to one or more vehicle systems associated with the vehicle.

2. The method of claim 1, wherein receiving radar data comprises receiving right radar data from a right short-range radar supported by a right rear portion of the vehicle, and receiving left radar data from a left short range radar supported by a left rear portion of the vehicle, and estimating the trailer angle is based upon the right radar data and the left radar data.

3. The method of claim 1, wherein the radar data comprises an estimate of the trailer angle generated by the at least one short range radar, and the camera data comprises an estimate of the trailer angle generated by the camera.

4. The method of claim 1, wherein estimating the trailer angle is performed by data processing hardware in the camera, in the at least one short range radar or in the vehicle that is separate from the camera and the at least one short range radar.

5. The method of claim 1, wherein weights for the statistically weighted averaging are based upon one or more of a light condition of the environment of the vehicle and trailer, a most recently estimated trailer angle, or a number of reflections associated with the radar data.

6. The method of claim 1, wherein estimating the trailer angle uses a Kalman filter.

7. The method of claim 1, wherein estimating the trailer angle comprises fusing the camera data and the radar data.

8. A method for determining at least one parameter of a trailer coupled to a vehicle, the method comprising:
   receiving camera data from a camera supported by a rear portion of the vehicle;
   receiving radar data from at least one short range radar supported by the vehicle;
   estimating a trailer angle between a trailer and the vehicle coupled thereto based on the camera data and the radar data;
   estimating a wheelbase of the trailer based upon the camera data and the radar data, wherein the radar data includes an estimate of the wheelbase generated by the at least one short range radar, and the camera data includes an estimate of the wheelbase generated by the camera; and
   sending at least one of the estimated trailer angle and estimated wheelbase to one or more vehicle systems associated with the vehicle.

9. A system for determining at least one parameter of a trailer coupled to a vehicle, the system comprising:
   data processing hardware; and
   memory hardware in communication with the data processing hardware, the memory hardware storing instructions that when executed on the data processing hardware cause the data processing hardware to perform operations comprising:

receiving camera data from a camera supported by a rear portion of the vehicle;

receiving radar data from at least one short-range radar supported by a rear portion of the vehicle;

estimating a trailer angle between a trailer and the vehicle coupled thereto based on the camera data and the right radar data using statistically weighted averaging of the left radar data the right radar data and the camera data; and sending the estimated trailer angle to one or more vehicle systems associated with the vehicle.

10. The system of claim 9, wherein receiving radar data comprises receiving right radar data from a right short-range radar supported by a right rear portion of the vehicle, and receiving left radar data from a left short range radar supported by a left rear portion of the vehicle, and estimating the trailer angle is based upon the right radar data and the left radar data.

11. The system of claim 9, wherein the data processing hardware is in the camera, in the at least one short range radar or in the vehicle that is separate from the camera and the at least one short range radar.

12. The system of claim 9, wherein weights for the statistically weighted averaging are based upon one or more of a light condition of the environment of the vehicle and trailer, a most recently estimated trailer angle, or a number of reflections associated with the radar data.

13. The system of claim 9, wherein estimating the trailer angle uses a Kalman filter.

14. The system of claim 9, wherein estimating the trailer angle comprises fusing the camera data and the radar data.

15. The system of claim 9, wherein the radar data comprises an estimate of the trailer angle generated by the at least one short range radar and the camera data comprises an estimate of the trailer angle generated by the camera.

16. The system of claim 9, wherein the operations further comprises estimating a wheelbase of the trailer based upon the camera data and the radar data, wherein the radar data includes an estimate of the wheelbase generated by the at least one short range radar, and the camera data includes an estimate of the wheelbase generated by the camera.

* * * * *